US012190447B2

(12) United States Patent
Kangasluoma et al.

(10) Patent No.: US 12,190,447 B2
(45) Date of Patent: Jan. 7, 2025

(54) VOLUME INTERSECTION USING ROTATED BOUNDING VOLUMES

(71) Applicant: ADVANCED MICRO DEVICES, INC., Santa Clara, CA (US)

(72) Inventors: Miikka Kangasluoma, Pori (FI); Kiia Kallio, Noormakuu (FI); Daniel James Skinner, Milton Keynes (GB)

(73) Assignee: Advanced Micro Devices, Inc., Santa Clara, CA (US)

( * ) Notice: Subject to any disclaimer, the term of this patent is extended or adjusted under 35 U.S.C. 154(b) by 193 days.

(21) Appl. No.: 17/843,075

(22) Filed: Jun. 17, 2022

(65) Prior Publication Data

US 2023/0410426 A1    Dec. 21, 2023

(51) Int. Cl.
  *G06T 17/10*   (2006.01)
  *G06T 15/08*   (2011.01)
  *G06T 17/00*   (2006.01)

(52) U.S. Cl.
  CPC ............. *G06T 17/10* (2013.01); *G06T 15/08* (2013.01); *G06T 17/005* (2013.01); *G06T 2210/21* (2013.01)

(58) Field of Classification Search
  CPC ....... G06T 17/10; G06T 17/005; G06T 15/08; G06T 15/06; G06T 2210/21
  USPC ........................................ 345/418, 419, 426
  See application file for complete search history.

(56) References Cited

U.S. PATENT DOCUMENTS

| | | | |
|---|---|---|---|
| 8,836,702 B2 | 9/2014 | Hyun et al. | |
| 11,157,414 B2 | 10/2021 | Muthler et al. | |
| 2006/0256112 A1 | 11/2006 | Heirich et al. | |
| 2009/0167763 A1* | 7/2009 | Waechter | G06T 15/40 345/426 |
| 2012/0330628 A1 | 12/2012 | McDaniel et al. | |
| 2016/0292908 A1* | 10/2016 | Obert | G06T 15/005 |
| 2018/0182158 A1* | 6/2018 | Karras | G06T 15/06 |
| 2020/0074716 A1* | 3/2020 | Kaplan | H04N 13/344 |
| 2022/0020201 A1* | 1/2022 | Fenney | G06F 9/5027 |
| 2022/0044467 A1* | 2/2022 | Woop | G06T 1/20 |
| 2022/0068009 A1 | 3/2022 | Wald et al. | |

OTHER PUBLICATIONS

International Search Report issued in Application No. PCT/US2023/025429, mailed Oct. 17, 2023, 8 pages.

* cited by examiner

*Primary Examiner* — Prabodh M Dharia

(57) ABSTRACT

One or more rotated bounding volumes are generated for one or more nodes of a bounding volume hierarchy (BVH). Volume intersection ray tracing tests are then be performed using the rotated bounding volumes with the aim of reducing the number of calculations required relative to an original, non-rotated bounding volume. Rotated bounding volumes are selected from a plurality of candidate rotations, and selection of one of the candidate rotations are based on surface areas, such as minimum total surface areas, of bounding volumes corresponding to each of the candidate rotations. In order to minimize data storage and increase performance, a number of candidate rotations may be limited to a predetermined set of rotations.

20 Claims, 5 Drawing Sheets

VOLUME INTERSECTION USING ROTATED BOUNDING VOLUMES

BACKGROUND

Ray tracing and other ray traversal processes often rely on the use of a bounding volume hierarchy (BVH), which is a tree structure representing a set of geometric objects within a scene to be rendered. The geometric objects (e.g., triangles or other primitives) are enclosed in bounding boxes or other bounding volumes that form leaf nodes of the tree structure, and then these nodes are grouped into small sets, with each set enclosed in their own bounding volumes that represent a parent node on the tree structure, and these small sets then are bound into larger sets that are likewise enclosed in their own bounding volumes that represent a higher parent node on the tree structure, and so forth, until there is a single bounding volume representing the top node of the tree structure and which encompasses all lower-level bounding volumes.

The BVH is then used to identify potential intersections between generated rays and the geometric objects in the scene by traversing the nodes of the BVH, where at each node being traversed a ray of interest is compared with the bounding volume of that node to determine if there is an intersection, and if so, continuing on to the next node in the corresponding branch, and so forth. Thus, if no intersection is detected for a bounding volume of a higher parent node, the intersection algorithm can correctly conclude that the ray of interest will likewise not intersect any of the smaller bounding volumes of the lower-level child nodes reached from that parent node and thus may skip further traversal of that branch of the tree structure. While the use of a BVH can provide for more efficient ray-object intersection (or collision detection), in graphics systems with high frame rendering rates, high pixel resolution, and/or complex scenes, the large number of calculations required to perform the BVH traversal for a high number of rays per frame at a high number of frames per second can excessively tax the graphics resources of the system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for using rotated bounding volumes in a BVH to identify potential intersections with the BVH. In at least some embodiments, the rotated bounding volumes are selected to reduce the portion of the volume that does not include an object. The use of rotated bounding volumes thus reduces the number of intersection tests that incorrectly predict an intersection with an object, thus reducing the overhead associated with BVH traversal, and conserving overall system resources.

To illustrate, conventional BVH-based ray intersection techniques perform the BVH-traversal process separately for each ray of interest, resulting in a considerable volume of calculations. However, it can be observed that applying rotations to bounding volumes in a BVH can significantly reduce the scale of requisite calculations for detecting volume intersections. In particular, for at least some nodes of BVH, a rotated bounding volume results in the corresponding set of objects occupying a larger portion of the volume. Accordingly, an intersection test based on the rotated volume is more likely to be accurate—that is, is more likely to correctly indicate whether a given ray intersects with one of the objects. Accordingly, using the techniques herein, for at least one node of a BVH, the corresponding bounding volume is rotated to increase the percentage of the volume that is occupied by an object, and the rotated volume is then employed in the BVH traversal.

In some embodiments, a rotated bounding volume implemented in accordance with aspects of the present disclosure includes an index indicating a rotation used to create the rotated bounding volume and coordinates for an original bounding volume created from a child node such that the geometry it includes is rotated to have a more optimal orientation, thus minimizing data storage requirements and increasing computing efficiency. The rotated bounding volume is used to replace an original, non-rotated (e.g., axis-aligned) bounding volume in some embodiments and used together with the original bounding volume for greater accuracy in other embodiments. When the two bounding volumes are used together, the volume intersection result is based on the combination of intersection tests for the two volumes. In some embodiments, an intersection test for a rotated bounding volume uses the same or similar logic as that used with the original bounding volumes by rotating the ray origin and direction before the test based on the same rotation that was used when the rotated bounding volume was created. As described further hereinbelow, in various embodiments, rotated bounding volumes are implemented in a number of different ways depending on, e.g., whether real-time graphics rendering needs to be performed.

Figure 1:
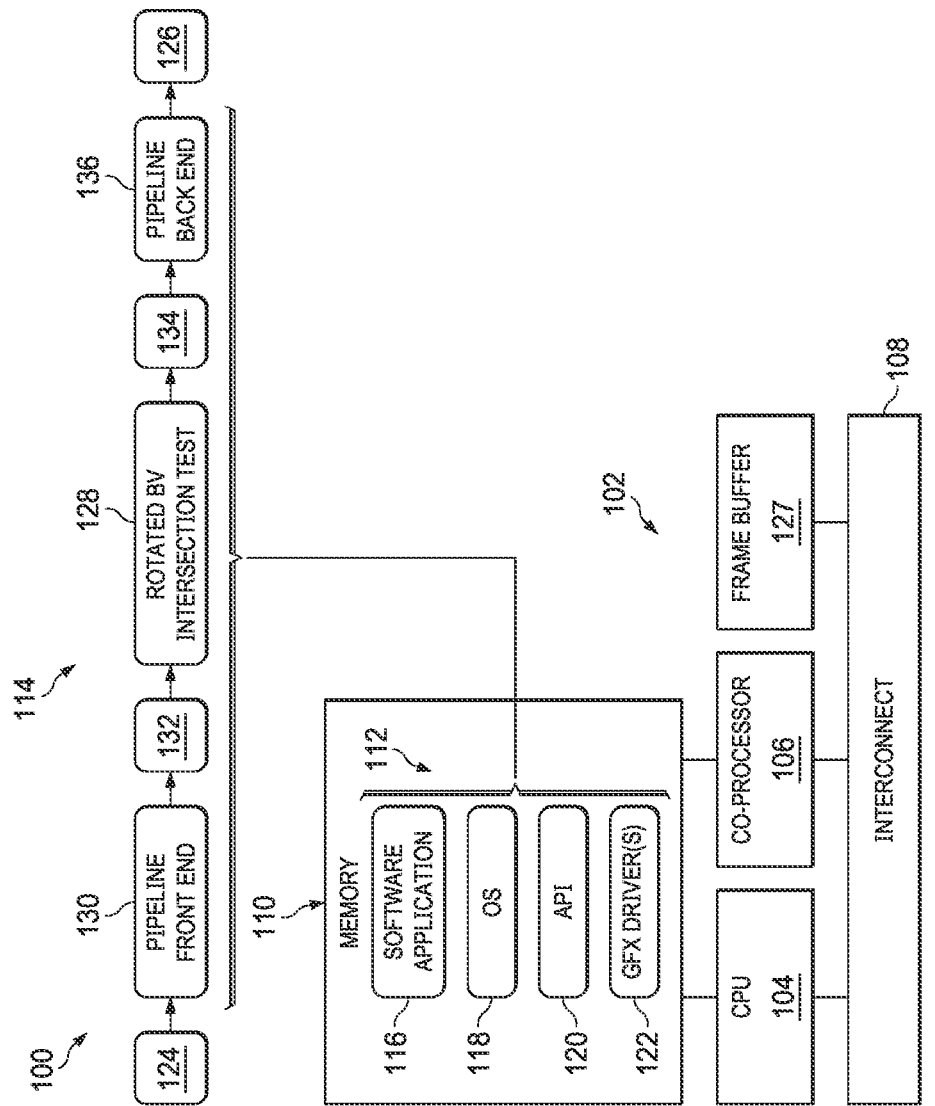
FIG. 1 is a block diagram of a processing system employing a graphics pipeline with volume intersection detection using rotated bounding volumes in accordance with some embodiments.

FIG. 1 illustrates a processing system 100 utilizing a rotated bounding volume intersection test process in accordance with at least some embodiments of the present disclosure. As depicted by hardware configuration 102, the processing system 100 includes one or more central processing units (CPUs) 104 and one or more graphics co-processing units (such as one or more graphics processing units, ML engines, or application-specific integrated circuits) 106 interconnected via one or more interconnects 108 (e.g., a Peripheral Component Interconnect Express (PCIe) interconnect, an Infinity fabric, etc.), and connected to one or more memories 110, such as a system memory, a graphics memory, and the like. The processing system 100 further includes other components that are omitted from FIG. 1 for ease of illustration, such as one or more displays, keyboards, mice, and other input/output (I/O) devices and their corresponding controllers, memory controllers, power management components, and the like.

The one or more memories 110 store a software stack 112 that, when executed by the one or more CPUs 104 and/or one or more co-processors 106, implement a graphics pipeline 114 that operates to render a sequence of video frames representing video content, which includes the video content of a computer-generated imagery (CGI)-based video (e.g., a movie or television show), the video content of game play in a virtual world of a video game, and the like. The software stack 112 thus includes one or more software applications 116 that operates to manipulate the one or more CPUs 104 to generate a representation of a virtual scene that is to be rendered as a video frame or subsequence of frames from a particular viewpoint, and generates a representation of this virtual scene, including view point information, a 3D model of the scene in the form of information describing the scene and the geometric objects therein in the form of graphics primitives (e.g., triangles, rectangles, N-sided polygons, etc.), texture, lighting, shading, and motion information. The software application 116 then submits, via an operating system (OS) 118, this representation with associated rendering commands to one or more graphics application programming interfaces (APIs) 120 executing on the CPU(s) 104 via various function calls to the one or more APIs 120. Examples of such APIs 120 include Vulkan™, Microsoft DirectX™, OpenGL™, OpenCL™, and the like. The one or more APIs 120 in turn then coordinate with one or more graphics drivers 122 executing at the CPU(s) 104, such as user-mode graphics drivers and kernel-mode graphics drivers, to directly control and otherwise manipulate the co-processor(s) 106 and other graphics acceleration hardware to perform corresponding operations in support of the rendering process of the graphics pipeline 114.

For each frame of a sequence of frames to be rendered, the graphics pipeline 114 operates to receive input 124 representing a virtual scene and associated information pertaining to how the frame is to be rendered from a viewpoint of that scene and to process the input 124 accordingly to render a corresponding rendered frame 126 that is then temporarily stored in a frame buffer 127 and then transmitted to a destination, such as by wired or wireless transmission via a display interface to a display device for display, transmitted to an encoder for encoding for storage, network transmission, or subsequent display, and the like. As such, in some embodiments, the graphics pipeline 114 implements a rasterization process or a ray tracing process (or both) for purposes of rendering frames. Either approach may utilize a ray-object intersection test for various purposes. For example, in a ray tracing process, the path of a light "ray" is traced from a viewpoint (the "camera") through a corresponding pixel of a two-dimensional (2D) plane (the image plane) into the three-dimensional (3D) virtual scene (object space or world space) and if and when that ray encounters (intersects or "hits") a geometric object in the scene, information about the point of impact on the geometric object's surface contributes to the pixel color and illumination of the pixel of the image plane through which the ray passed (and thus the color and illumination of the corresponding pixel in the rendered frame that is represented by the image plane). In a rasterization-based rendering process, a ray-object intersection test is employed in, for example, various culling operations, such as view frustum culling, occlusion culling, backface culling, mesh culling, and the like.

In conventional approaches, the ray-object intersection test typically is performed on a per-ray basis, and thus involves a significant number of calculations to be performed for each ray. Although certain traversal acceleration structures, such as BVHs, can accelerate the process, the ray-object intersection test still requires significant computational resources and thus limits its use in real-time applications such as video games. Accordingly, in at least one embodiment, the graphics pipeline 114 implements a rotated bounding volume intersection test stage 128 that generates rotated bounding volumes and determines an optimal bounding volume for the test before investigating the potential intersection of each ray of the subset with the geometric objects within the bounding volume. In other embodiments, a separate stage prior to the rotated bounding volume intersection test stage 128, such as a BVH generation stage (not shown), generates rotated bounding volumes for use in the rotated bounding volume intersection test stage 128. In these embodiments, the BVH generation stage constructs the BVH with rotated bounding volumes and encodes a selected rotation corresponding to optimal bounding volumes at each BVH node. Then, when the intersection test stage 128 traverses the BVH, it conducts the intersection test using the previously determined rotated bounding volumes to transform the ray used in the intersection test such that the bounding volumes remain axis-aligned but, from the point of view of the ray, the bounding volumes appear to be rotated based on the respective rotations selected at the BVH generation stage.

Thus, a pipeline front-end stage 130 of the graphics pipeline 114 receives the input 124 and processes the input 124 to generate a set of rays that are to be used to interrogate the scene and generates a 3D representation of the scene to be rendered into a corresponding rendered frame, including a 3D model of the scene, the viewpoint, the image plane details (including position, resolution, and the like), and then issues one or more function calls 132 to the API 120 to initiate ray-object intersection tests for some or all of the generated rays using the information representing the scene. The API 120 instructs the rotated bounding volume intersection test stage 128 to perform the ray-object intersection tests using one or more of the techniques described herein to generate intersection test results 134 that represent any detected intersections of rays with corresponding objects in the scene. The intersection test results 134 are then provided to a pipeline back-end stage 136, which uses the represented ray-object intersections to further the rendering process. For example, in some embodiments, in a rasterization-based rendering process, the intersection test results 134 identify and cull rays that do not intersect primitives, to identify and cull primitives occluded by other primitives/objects in the foreground, and the like. In a ray-tracing-based rendering process, the ray-object intersections inform the color and/or luminosity of corresponding pixels of the resulting rendered frame 126.

Figure 2:
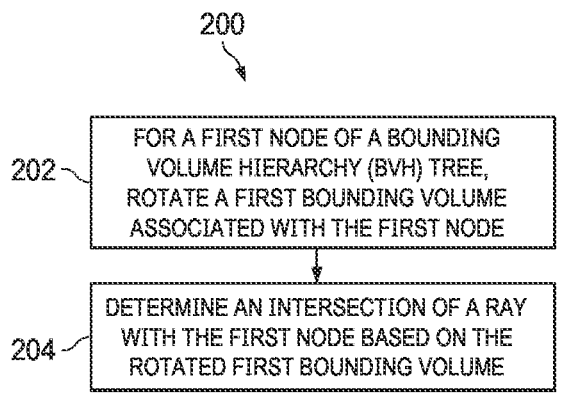
FIG. 2 is a flow diagram illustrating a method for detecting volume intersection using rotated bounding volumes in accordance with some embodiments.

FIG. 2 illustrates an example method 200 for performing the rotated bounding volume intersection test stage 128 (hereinafter, "the intersection test stage 128" for brevity) in accordance with some embodiments. In some embodiments, aspects of the method 200 are implemented by dedicated hardware at the CPU 104 and/or co-processor 106 of the system 100 of FIG. 1. To facilitate understanding, the method 200 is described below with reference to FIG. 3, which depicts an example implementation 300 of the method 200. The method 200 initiates with the intersection test stage 128 receiving a representation of the ray traversal workload for which ray tracing is to be performed, which as noted above, initiates with one or more function calls to an API 120, with the functional call(s) having pointers or other identifier of a location of the one or more data structures containing the data for this representation. This data typically includes one or more models of the scene being rendered, viewpoint information, and in some instances a set of rays generated by the software application 116. The intersection test stage 128 then performs initial processing to prepare for intersection testing using this information, including any prefiltering of geometric objects, coordinate system transformations, and the like, and in the event that a set of rays is not already generated, generating a set of rays that project from the camera viewpoint through corresponding pixels of the image frame into the scene represented by the 3D model(s).

Figure 3:
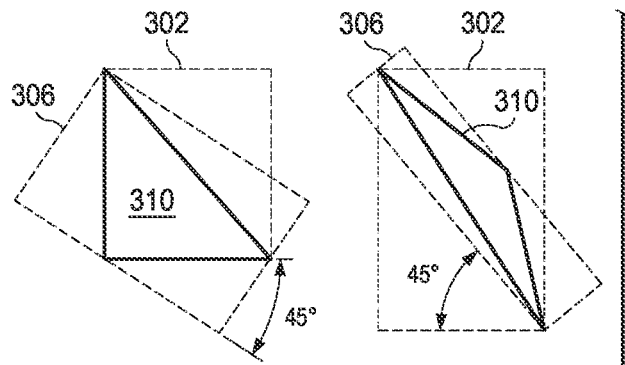
FIG. 3 is a diagram illustrating examples of rotated bounding volumes in accordance with some embodiments.
Figure 3:
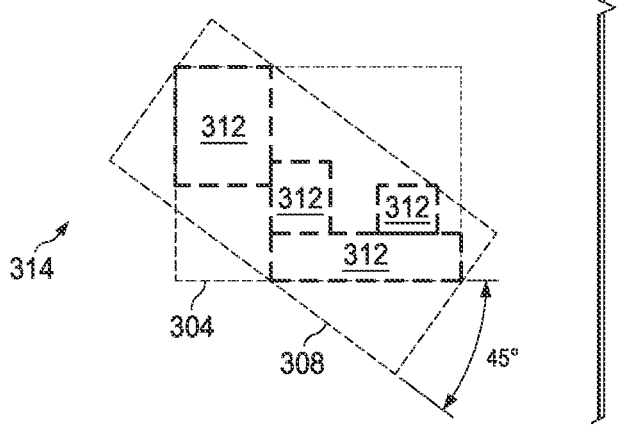

At block 202, the intersection test stage 128 rotates a bounding volume associated with a first node of a BVH, such as one of the two different bounding volumes 302 or the parent bounding volume 304 of FIG. 3, in an attempt to reduce a total volume of the bounding volume and/or a volume of empty space in the bounding volume with the goal of reducing the number of tests that must be performed by the intersection test stage 128. By rotating the bounding volume, the intersection test stage 128 produces a rotated bounding volume, such as rotated bounding volume 306 or rotated parent bounding volume 308 of FIG. 3, which contains one of the primitives 310 or the child node bounding volumes 312. As seen in the example of FIG. 3, the bounding volumes 302 and parent bounding volume 304 are rotated by 45 degrees in a single dimension to produce the rotated bounding volumes 306 and rotated parent bounding volume 308. However, it will be understood by one of ordinary skill in the art after reviewing this application in its entirety that rotations other than 45 degrees and rotations in two or more dimensions are used in other embodiments.

At block 204, the intersection test stage 128 proceeds to performing intersection testing using a rotated bounding volume by performing an intersection test between a ray of interest and a graphics primitive represented by the current node of the BVH using any of a variety of well-known individual ray intersection testing processes known in the art. This per-ray intersection test is then be repeated for some or all of the remaining rays used by the intersection test stage 128. The intersection test stage 128 then further traverses the BVH according to a specified traversal process and the process is repeated until the BVH has been traversed and all the rays used by the intersection test stage 128 have been intersection tested according to the techniques described herein, then intersection test results 134 are provided to the pipeline back-end stage 136 for further processing.

As can be seen in example 314 of FIG. 3, the bounding volume 302 contains a relatively large amount of empty space such that ray intersection testing will return a false positive result (that is, will incorrectly indicate a potential intersection with the primitive 310) relatively frequently, as a ray will often intersect the bounding volume 302 without actually intersecting the primitive 310. However, by rotating the bounding volume to produce the rotated bounding volume 306 and rotating the ray using the same transformation matrix used to generate the rotated bounding volume, the amount of empty space in the rotated bounding volume is reduced. Therefore, the number of false positives is reduced in the ray intersection testing, which in turn reduces the processing overhead of the intersection test stage 128.

In some embodiments, in order to reduce storage space needed to represent various rotated bounding volumes, the intersection test stage 128 uses a fixed rotation table that includes each permutation of 45-degree rotations in each dimension. Using such a fixed rotation table, all of the different combinations of the possible rotation matrices are precalculated and stored in a lookup table having only 22 entries (21 plus a null rotation). In this example, with all of the different rotations already stored in the fixed rotation table, the intersection test stage 128 only requires a five-bit index to identify which of the rotations was used for a particular rotated bounding volume. These 22 entries include all the variations of how the geometry can be rotated based on the 45-degree permutations to get the best fitting bounding volume. In an embodiment, the set of rotations in such a fixed rotation table include the following combinations in addition to a null rotation index:

Index 0=X45°, Y0°, Z0°
Index 1=Y45°, X0°, Z0°
Index 2=Z45°, X0°, Y0°
Index 3=X45°, Y45°, Z0°
Index 4=X45°, Z45°, Y0°
Index 5=Y45°, X45°, Z0°
Index 6=Y45°, Z45°, Z0°
Index 7=Z45°, X45°, Y0°
Index 8=Z45°, Y45°, X0°
Index 9=X45°, Y45°, Z45°
Index 10=X45°, −Y45°, Z45°
Index 11=X45°, −Z45°, Y45°
Index 12=X45°, Z45°, Y45°
Index 13=Y45°, X45°, Z45°
Index 14=Y45°, −X45°, Z45°
Index 15=Y45°, Z45°, X45°
Index 16=Z45°, −X45°, Y45°
Index 17=Z45°, −Y45°, X45°
Index 18=Z45°, X45°, Y45°
Index 19=Z45°, Y45°, X45°
Index 20=Y45°, −Z45°, X45°

In some embodiments, the rotation for the geometry and the selection of which rotation is optimal to arrive at an optimal, or best fitting, bounding volume is performed when the intersection test stage 128 is creating the BVH. In some embodiments, the rotated bounding volume selection is implemented by the intersection test stage 128 rotating a bounding volume based on a selection from a plurality of candidate rotations, and then selecting one of the candidate rotations having a smallest surface area. In some embodiments, the geometry below the node is rotated rather than bounding volumes from the child nodes, as rotation performed on child bounding volumes often results in empty space in the child boxes accumulating to the upper levels of the BVH and thus increasing processing requirements.

In some implementations, such as non-real-time applications, there may be sufficient time to generate rotated bounding volumes that are further reduced in volume to further limit processing requirements. However, in implementations where, for example, graphical content is dynamically changing and the intersection test stage 128 needs to create or traverse the BVH in real-time, it is desirable for the method for generating the rotated bounding volumes to be more efficient. Accordingly, two different methods to identify an optimal rotated bounding volume are presented herein: a box area-based selection better suited for real-time implementations, such as video games, as shown for example in FIGS. 3 and 4, and a clipped hexagon area-based selection better suited for non-real-time applications, such as rendering animations for motion pictures, discussed further below in the context of FIG. 5. The box area-based method is faster more efficient to run, as in some embodiments it sums the surface areas from generated rotated bounding volumes and selects one with the smallest total surface area. However, this approach often results in a higher amount of empty space in a given bounding volume. To generate a rotated bounding volume with less empty space, a clipped hexagon area-based method utilizes a parent bounding volume in order to determine a rotated bounding volume. In some embodiments, a clipped hexagon area-based method determines the surface area of a rotated bounding volume after it is further reduced in volume based on a parent bounding volume. A clipped hexagon area-based method performed in accordance with the teachings of the present disclosure typically requires fewer calculations, and thus reduced processing requirements, at intersection test stage 128 after determining the reduced rotated bounding volumes; however, the process of generating the reduced rotated bounding volumes requires more calculations than the box area-based method.

In some embodiments, a rotated bounding volume is transformed to an origin of a coordinate system or to the same coordinates as an original bounding volume. If the intersection test stage 128 rotates the original bounding volume without transformation, the rotated bounding volume may have coordinates varying wildly from the original bounding volume. However, if the intersection test stage 128 transforms the rotated bounding volume before the rotation, the new coordinates may be relative to the origin or relative to the center of the original bounding volume.

When the rotated bounding volume is generated for BVH levels other than a leaf node's parent, the rotation applies to all the geometry the node includes. Accordingly, the result for a parent may not be optimal if the intersection test stage 128 performs rotation based only on the corners of child bounding volumes, as empty space from bounding volumes before the parent accumulate from every level.

In some embodiments, with geometry after an instance node, the intersection test stage 128 requires only one instance from the rotations, as the geometry after the instance node has the same transformation. However, the parent bounding volume before the instance node should take the transformation of the instance node into account and select the best rotation as a result.

Figure 4:
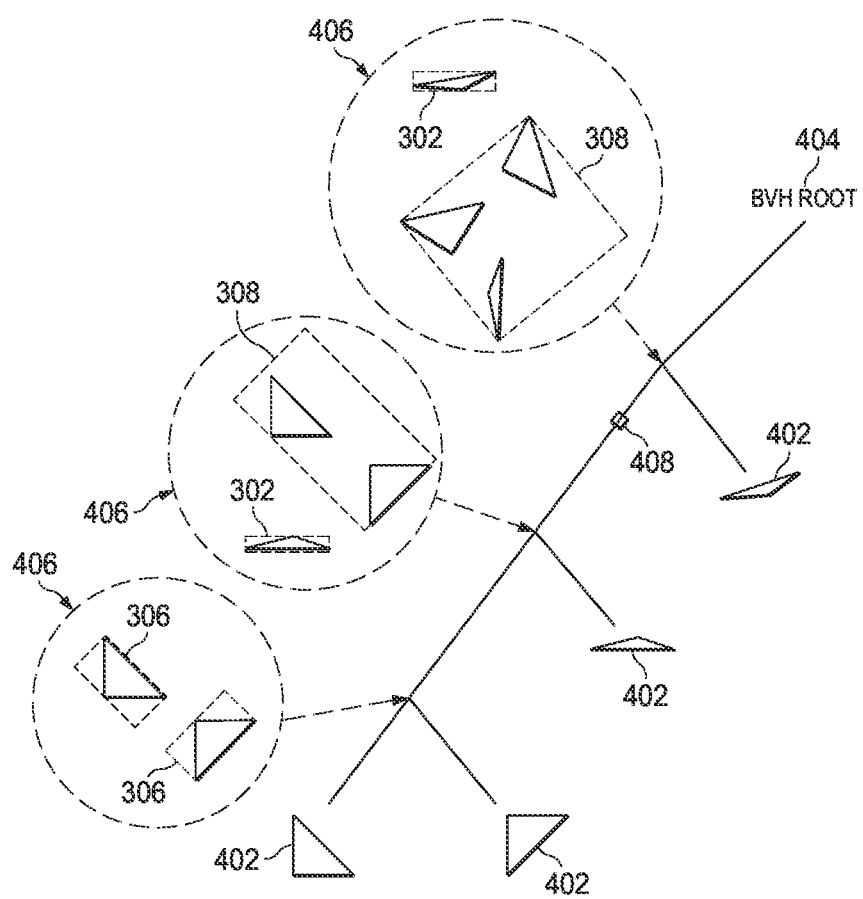
FIG. 4 is a diagram illustrating an example of the method of FIG. 2 in accordance with some embodiments.

FIG. 4 illustrates an example implementation of method 200 performing aspects of the intersection test stage 128 in accordance with some embodiments. In this example, the intersection test stage 128 traverses, or walks, the BVH from leaves 402 to root 404. At each node, such as the various box nodes 406, the intersection test stage 128 generates a number of rotated bounding volumes, such as the various rotated bounding volumes 306 and parent rotated bounding volumes 308, based on geometry below them in the BVH, such as one or more original bounding volumes 302. In some embodiments, the intersection test stage 128 utilizes instance nodes, such as instance node 408, which perform transformations for the geometry below in the BVH when analyzing a parent box below the instance node. In some embodiments, after all of the nodes have been processed, the intersection test stage 128 starts from the root node 404 and traverses all the nodes to the leaves 402 by selecting the rotated bounding volume having the smallest surface area.

Figure 5:
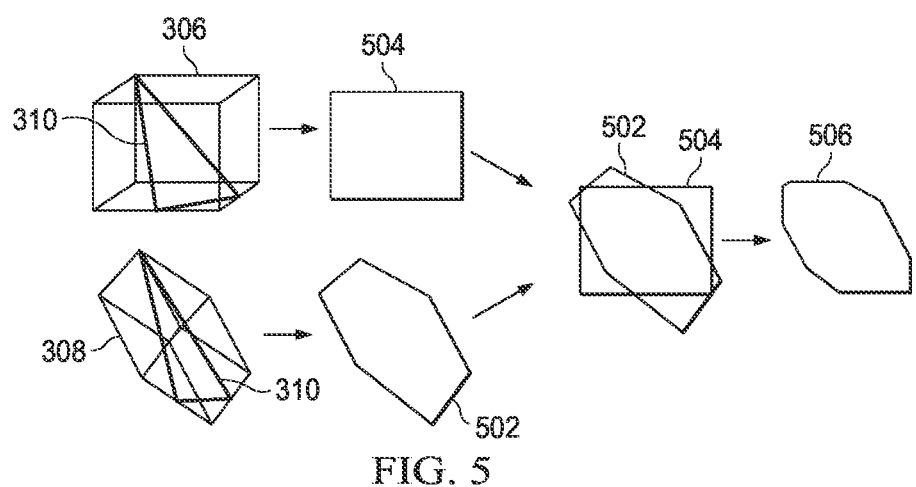
FIG. 5 is a diagram illustrating another example of the method of FIG. 2 in accordance with some embodiments.

FIG. 5 illustrates an example implementation of method 200 performing aspects of the intersection test stage 128 in accordance with some embodiments. In this example, the intersection test stage 128 uses a clipped hexagon area-based selection. After generating a rotated bounding volume 306 containing a primitive 310 for each node, the intersection test stage 128 also transforms a parent bounding volume containing the primitive 310 using the same rotation matrix used to generate a parent rotated bounding volume 308. The intersection test stage 128 then uses the parent rotated bounding volume to generate a flattened hexagon shape 502 in each dimension and clips, or removes, any area in a flattened rotated bounding volume 504 outside of the flattened hexagon shape 502 for each respective dimension to produce a clipped hexagon area 506. The intersection test stage 128 then sums together each of the clipped hexagon areas 506 for each dimension selects a candidate rotation having clipped hexagon areas with the smallest cumulative surface area as an optimal reduced rotated bounding volume. Notably, in some embodiments, the parent bounding volume used to generate the clipped hexagon areas 506 is the same bounding volume that was used in a previous node intersection test. When the rotated bounding volume and the geometry is after an instance node such as instance node 408, the parent bounding volume should be in the same coordinate space with the child rotated bounding volume.

Figure 6:
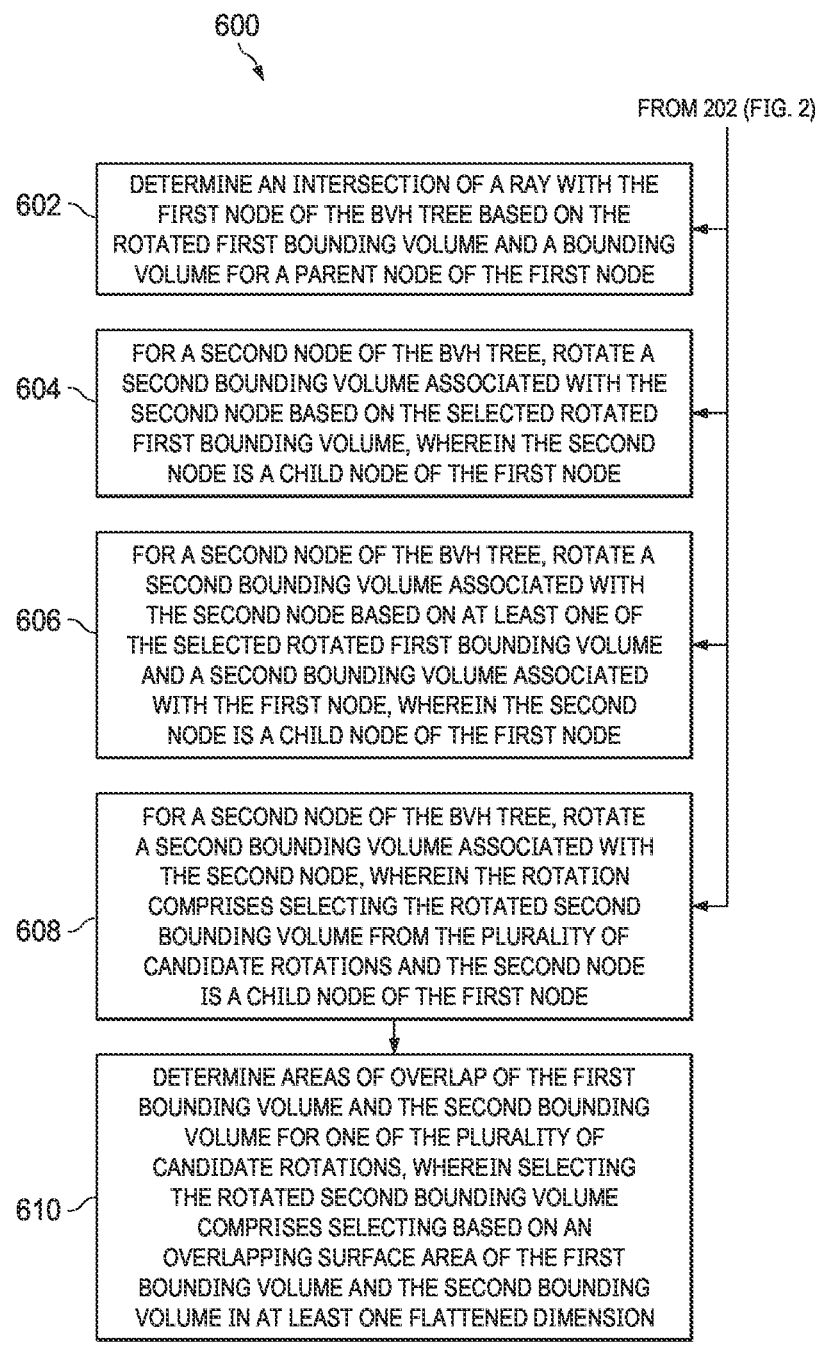
FIG. 6 is a flow diagram illustrating sub-processes of the method of FIG. 2 in accordance with some embodiments.

FIG. 6 illustrates alternative various sub-processes 600 that are used in implementing the method of FIG. 2 in accordance with some embodiments. For example, in some embodiments, a rotated bounding volume and an original bounding volume are used together. As shown at block 602, in some embodiments, the intersection test stage 128 determines an intersection of a ray with the first node of the BVH tree based on the rotated first bounding volume and a bounding volume for a parent node of the first node. In some embodiments, a combined intersection test with this kind of bounding volume pair returns fewer false positive results when compared to an intersection test based only on an original bounding volume. However, because the BVH tree has multiple levels of hierarchy, and the previous level of the node also has a bounding volume that includes all the same geometry, it is not necessarily required to use a second bounding volume in the same node to achieve a similar two bounding volume result. For example, in the BVH tree, the parent bounding volume may cull most of the rays that will miss the geometry such that when an intersection test is performed for a rotated bounding volume at a current level with a different rotation, it will cull the false positive rays that passed the parent test.

In general, even if there is no two bounding volume intersection possible, the rotated bounding volume is in some cases more efficient than an original, non-rotated bounding volume. In the case where the geometry has also been rotated, the original bounding volume can be very coarse. The bounding volume sides are aligned to the geometry, but because bounding volumes are often defined only by with minimum and maximum values from the geometry, it can still include a significant amount of empty space.

As shown at block 604, in some embodiments, for a second node of the BVH tree, the intersection test stage 128 rotates a second bounding volume associated with the second node based on the selected rotated first bounding volume for the first node, wherein the second node is a child node of the first node. In this example, the intersection test stage 128 performs a ray intersection testing processes for a child node where the intersection test stage 128 rotates the ray origin and direction using the same rotation from a parent rotated bounding volume. For this rotation, in some embodiments, as will be understood by those of ordinary skill in the art after reading this disclosure in its entirety, the intersection test stage 128 uses existing transformation logic associated with instance nodes. However, in some embodiments, other methods of generating or analyzing rotated bounding volumes are utilized, such as directly rotating, or transforming, one or more bounding volumes, primitives, and/or coordinate systems.

In some embodiments, if a rotated bounding volume also accounts for the original, non-rotated bounding volume and the result from the box intersection test is based on the combination of testing the rotated bounding volume and the original bounding volume, there will be two intersection tests: one for the original bounding volume by using the original origin and direction and a second for the rotated bounding volume by using the rotated origin and direction. Accordingly, in some embodiments, the rotated bounding volume replaces the original bounding volume or is utilized in addition to the original bounding volume. An advantage for this approach is that additional transformation logic for the rotated rays is not required, because when there is only one rotated ray, in some embodiments, the ray is generated using the current instance node transformation logic.

As shown at block 606, in some embodiments, for a second node of the BVH tree, the intersection test stage 128 rotates a second bounding volume associated with the second node based on at least one of the selected rotated first bounding volume and a second bounding volume associated with the first node, wherein the second node is a child node of the first node. This example implementation enables efficient operation by using only two rotation candidates for each node (e.g., two five-bit indexes). In some embodiments, the intersection test stage 128 identifies the rotation candidates by choosing the two most optimal rotations when the intersection test stage 128 analyzes the child nodes. When these two rotations have been selected, the remaining child nodes use one of these two rotations for generating rotated bounding volumes based on which fits better to the child geometry, which, in some embodiments, is estimated based on which rotated bounding volume has the smallest surface area.

As shown at block 608, in some embodiments, for a second node of the BVH tree, the intersection test stage 128 rotates a second bounding volume associated with the second node, wherein the rotating comprises selecting the rotated second bounding volume from the plurality of candidate rotations and the second node is a child node of the first node. This example provides the best result for a rotated bounding volume in some embodiments, because each of the children uses a unique rotation for every geometry, e.g., a unique index in a rotation table, such that each of the children has a different rotation in a parent node.

As shown at block 610, in some embodiments, intersection test stage 128 determines areas of overlap of the first bounding volume and the second bounding volume for one of the plurality of candidate rotations, wherein selecting the rotated second bounding volume comprises selecting based on an overlapping surface area of the first bounding volume and the second bounding volume in at least one flattened dimension. This implementation may comprise implementing a hexagon area-based selection, as discussed above with respect to FIG. 5.

In some embodiments, a quantized bounding volume is a more efficient method to save a child's original bounding volume data to a BVH node, although it may result in reduced bounding volume accuracy. A quantized bounding volume only stores scale values from the child original bounding volumes in the node data and these scale values are used with the parent original bounding volume coordinates to define the child original bounding volume borders. For example, if a parent original bounding volume minimum value is 0.0 and the maximum value is 512.0 and the child scale size is an unsigned integer of, e.g., 8 bits, then if the child original bounding volume minimum scale is 127, the child's minimum coordinate would be (512.0-0.0)/(256/127) =254.0.

With a quantized bounding volume, it could also be reasonable to translate a rotated bounding volume to the same location with the geometry, because if the node includes more than one rotation index, the coordinates for the individual bounding volume may be relatively far from each other and the parent bounding volume may be very large as a consequence. However, if the rotated bounding volume only uses one rotation index per node, then transformation is not needed. In this case, all the geometry will be rotated with the same transformation matrix, and, even if these are in different coordinates, all volumes should still be as far from each other as they were before the rotation.

If the rotated bounding volume has been transformed to the origin or to its original location, then the ray may also require a transformation when there is an intersection check. With quantized bounding volumes, translation to the same coordinate space may be needed because the resulting bounding volumes without translation may be separated by significant empty space. However, if a rotated bounding volume only uses one rotation index per node, translation may not be required.

In some embodiments, the apparatus and techniques described above are implemented in a system including one or more integrated circuit (IC) devices (also referred to as integrated circuit packages or microchips), such as the system 100 described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   for a first node of a bounding volume hierarchy (BVH) tree, rotating a first bounding volume associated with the first node by one of a plurality of candidate rotations;
   for a second node of the BVH tree, wherein the second node is a child node of the first node, rotating a second bounding volume associated with the second node by selecting the rotated second bounding volume from one of the plurality of candidate rotations, wherein selecting the rotated second bounding volume comprises selecting based on an overlapping surface area of the first bounding volume and the second bounding volume in at least one flattened dimension; and
   determining an intersection of a ray with the second node based on the rotated second bounding volume.

2. The method of claim 1, further comprising:
   generating a flattened hexagon shape in each dimension based on the first rotated bounding volume; and
   removing any area in a flattened rotated bounding volume outside of the flattened hexagon shape for each respective dimension to produce a clipped hexagon area of the first bounding volume.

3. The method of claim 1, wherein selecting the rotated first bounding volume comprises selecting based on surface areas of bounding volumes corresponding to each of the candidate rotations.

4. The method of claim 3, wherein selecting the rotated first bounding volume comprises selecting the candidate rotation associated with the bounding volume having a smallest surface area.

5. The method of claim 1, wherein the plurality of candidate rotations comprise rotations of 45 degrees in one or more dimensions.

6. The method of claim 5, wherein the plurality of candidate rotations comprise twenty-one unique rotations each separated by 45 degrees in at least one dimension.

7. The method of claim 1,
   wherein rotating the second bounding volume associated with the second node is based on the rotated first bounding volume.

8. The method of claim 1,
   wherein rotating the second bounding volume associated with the second node is based on at least one of the rotated first bounding volume and a second bounding volume associated with the first node.

9. The method of claim 1,
   wherein rotating the second bounding volume associated with the second node comprises selecting the rotated second bounding volume from the plurality of candidate rotations based on geometry below the second node in the BVH tree.

10. The method of claim 1, further comprising:
    determining areas of overlap of the first bounding volume and the second bounding volume for one of the plurality of candidate rotations.

11. The method of claim 1, wherein selecting the rotated second bounding volume comprises selecting the candidate rotation associated with the second bounding volume having a smallest overlapping surface area.

12. The method of claim 1, further comprising:
    determining an intersection of a ray with the first node of the BVH tree based on the rotated first bounding volume and a bounding volume for a parent node of the first node.

13. The method of claim 1, wherein the rotating comprises rotating the ray.

14. A processing system comprising:
    one or more central processing units (CPUs);
    one or more co-processors; and
    one or more memories coupled to the one or more CPUs and the one or more co-processors, the one or more memories storing instructions configured to manipulate at least one of the one or more CPUs or the one or more co-processors to:
    for a first node of a bounding volume hierarchy (BVH) tree, rotate a first bounding volume associated with the first node by one of a plurality of candidate rotations;
    for a second node of the BVH tree, wherein the second node is a child node of the first node, rotate a second bounding volume associated with the second node by selecting the rotated second bounding volume from one of the plurality of candidate rotations, wherein selecting the rotated second bounding volume comprises selecting based on an overlapping surface area of the first bounding volume and the second bounding volume in at least one flattened dimension; and determine an intersection of a ray with the second node based on the rotated second bounding volume.

15. The processing system of claim 14, wherein the instructions configured to manipulate at least one of the one or more CPUs or the one or more co-processors to rotate the first bounding volume comprise instructions configured to manipulate at least one of the one or more CPUs or the one or more co-processors to:

generate a flattened hexagon shape in each dimension based on the first rotated bounding volume; and remove any area in a flattened rotated bounding volume outside of the flattened hexagon shape for each respective dimension to produce a clipped hexagon area of the first bounding volume.

16. The processing system of claim 14, wherein the instructions configured to manipulate at least one of the one or more CPUs or the one or more co-processors to select the rotated first bounding volume comprise instructions configured to manipulate at least one of the one or more CPUs or the one or more co-processors to:

select based on surface areas of bounding volumes corresponding to each of the candidate rotations.

17. The processing system of claim 16, wherein the instructions configured to manipulate at least one of the one or more CPUs or the one or more co-processors to select the rotated first bounding volume comprise instructions configured to manipulate at least one of the one or more CPUs or the one or more co-processors to:

select the candidate rotation associated with the bounding volume having a smallest surface area.

18. The processing system of claim 14, wherein the plurality of candidate rotations comprise rotations of 45 degrees in one or more dimensions.

19. The processing system of claim 18, wherein the plurality of candidate rotations comprise twenty-one unique rotations each separated by 45 degrees in at least one dimension.

20. A processing system comprising:

one or more central processing units (CPUs); and one or more co-processors, wherein at least one of the one or more CPUs and one or more co-processors is configured to:

for a first node of a bounding volume hierarchy (BVH) tree, rotate a first bounding volume associated with the first node by one of a plurality of candidate rotations;

for a second node of the BVH tree, wherein the second node is a child node of the first node, rotate a second bounding volume associated with the second node by selecting the rotated second bounding volume from one of the plurality of candidate rotations, wherein selecting the rotated second bounding volume comprises selecting based on an overlapping surface area of the first bounding volume and the second bounding volume in at least one flattened dimension; and determine an intersection of a ray with the second node based on the rotated second bounding volume.

* * * * *